Figure 1A:
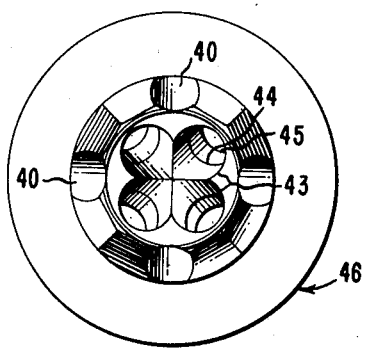

April 14, 1964  D. F. BOUCHER ETAL  3,128,794
FLUID FLOW INVERTER
Original Filed Aug. 21, 1959

INVENTORS
DONALD FREDERICK BOUCHER
BYRON CHRISTOS SAKIADIS

BY *Harry E. Braddock*

ATTORNEY

United States Patent Office 3,128,794
Patented Apr. 14, 1964

3,128,794
FLUID FLOW INVERTER
Donald Frederick Boucher, New Castle, and Byron Christos Sakiadis, Wilmington, Del., assignors to E. I. du Pont de Nemours and Company, Wilmington, Del., a corporation of Delaware
Continuation of application Ser. No. 835,350, Aug. 21, 1959. This application Jan. 8, 1963, Ser. No. 250,161
4 Claims. (Cl. 138—37)

This invention relates to the flow of liquids in conduits and more particularly to means for equalizing the flow of viscous liquids in pipes.

Viscous liquids flowing in pipe lines commonly flow with a parabolic distribution of fluid velocity across the cross section of the pipe so that the fluid close to the walls of the pipeline is moving at a relatively low velocity in comparison with the liquid in the center. In many fluid processing systems, this distribution of velocity is extremely undesirable because the material flowing near the surface of the pipe resides in the system very much longer than that in the center.

In polymerization processes where molten polymer is transferred from one point to another by means of pipe lines, the relatively longer time of residence of the peripheral material can cause it to polymerize to a much higher molecular weight than the material in the center of the pipe. The resulting polymer consequently has an undesirably wide molecular weight distribution.

In the case of some polymers, such as nylon, the longer residence of the peripheral material in the pipeline leads to increased formation of gel particles in the polymer and these particles lower the quality of the fiber or other extruded article which may be formed from the polymer. With almost any viscous liquid which is pumped through conduits at high temperatures, the longer residence of the slower moving layer adjacent the walls of conduits will result in some undesirable degradation.

In the past, externally driven mixing devices have been used in efforts to overcome the unequal distribution of the velocities during viscous flow, but such devices are attended by many operating difficulties as well as being an undesirable additional expense, both for investment and operation. Such devices are also undesirable because high pressure stuffing boxes are required for the entrance of the shaft which operates the mixers. In the case of fluids of low or only moderate viscosity, alternate segmental baffles, disc-and-doughnut baffles, or devices such as disclosed in U.S. Patent No. 646,378, have been used with some success where there is no degradation of product by excessive hold-up. However, such baffles result in stagnant areas which are intolerable for many materials such as nylon, the polyacrylonitriles and the polyester polymers.

It is an object of the present invention to provide an improved process and improved apparatus for equalizing the flow of viscous fluids in pipelines. Another object is to provide a process and apparatus which are simple and economical to install and operate. A further object is to provide an improved apparatus which equalizes viscous flow without creating turbulence or stagnant areas in the polymer.

The above objects are accomplished in accordance with this invention by a process for equalizing the flow of viscous liquids in conduits which comprises periodically directing a portion of the relatively slow moving fluid near the walls of the conduit to flow inwardly toward an area in the vicinity of the axis of the conduit, thereby replacing some of the fluid in the center of the conduit and simultaneously directing a portion of the faster moving fluid in the center outwardly from the axis of the conduit toward the walls of the conduit, thereby replacing the peripheral fluid, the interchange being carried out in such manner that no turbulence is produced and no appreciable mixing of the inner and outer fluids takes place.

The process of this invention is accomplished by combining a conduit system, such as a pipeline, with one or more fluid-conducting bodies located within the system. Such a body is provided with conduit means extending completely through the body from its upstream end to its downstream end and which are oriented transversely to the axis of the body. These conduit means include at least one passageway converging from an area in the vicinity of the periphery to an area in the vicinity of the axis of the body and at least one passageway diverging from an area in the vicinity of the axis to an area in the vicinity of the periphery of the body. The converging and diverging passageways are preferably provided in a single body, but separate mating units containing the channels are suitable, and may be more convenient to construct. Preferably, the fluid-conducting body conforms to the inner surface of the conduit in which it is inserted. Since most conduit systems utilize cylindrical units, a generally cylindrical fluid-conducting body is preferred. The body may be fitted fluid-tight within the conduit system without additional securing means, but preferably such means are provided. Preferably, this means comprises an annular flange for simplicity, ease of construction, and ease of insertion as by placement between standard pipe flanges. The entrance to each fluid passageway is smoothly contoured to prevent mixing and to minimize pressure drop.

FIGURES 1a, b, and c show the improved flow inverter of this invention. This inverter provides a good compromise of low pressure drop, with accuracy of "cut" fraction and sharpness of transfer of the peripheral fluid. Inlets 40 (tapered inwardly as at 47 for easy access of the fluid to flaring converging passages 41) deliver fluid through the passages 41 from the periphery of a pipeline to the axial outlets 42, while inwardly tapering inlets 43 for the flaring diverging passages 44 deliver fluid from the axial area to the peripheral outlets 45.

By tapering each of the inlets 40 and 43 toward minimum diameters for each, and flaring each of passages 41 and 44 from the points of minimum diameter, it is possible to increase the cross section of the flow passages substantially over what they are at the minimum diameter points and thereby to secure a reduced pressure drop through the inverter. The point of minimum diameter is the location where the converging passages approach most closely to the diverging passages; and these diameters are, of course, made as large as possible consistent with maintaining a practical wall thickness between the adjacent passages. Flange 46 is provided for fitting the inverter into a conduit system.

This invention is particularly suitable for use in the transfer of molten polymers through pipelines where it is frequently desirable to take a small cut from the outside of the stream and use a considerable number of inverters.

Example 1

Figure 1B:
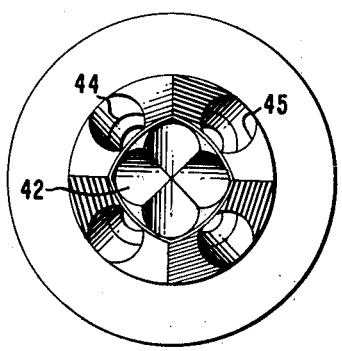
Figure 1C:
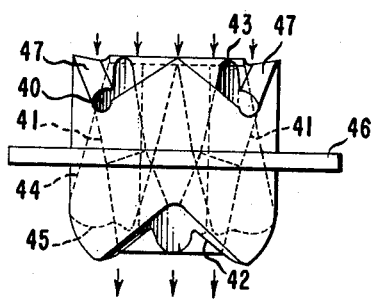

Corn syrup having a viscosity of 55.4 poises is pumped through a transparent plastic line of ⅝ inch diameter at a rate of 0.7 gallon per hour. A dye solution consisting of corn syrup and red dye and having a viscosity of 55 poises is injected into the flowing material and the flow pattern of the dyed syrup observed as it progresses through the pipe. It is observed that the dyed syrup follows a generally parabolic flow pattern with the material in the center moving much faster than the peripheral liquid. The dyed liquid in the center is observed to reach a point 9 feet from the injection point 17 minutes before the dyed peripheral liquid reaches this point. Nine flow inverters of a type similar to that shown in FIGURE 1 are inserted in the line at 10.8 inch intervals. Each inverter is designed to remove about 10% of the liquid flowing adjacent the periphery of the pipe, the peripheral liquid being passed into the center of the pipe and replaced by liquid from the center of the pipe as described previously. When dye is injected into the flowing syrup as before, it is observed that the dyed material in both the center and in the periphery reaches the observation point 9 feet distant at substantially the same time.

*Example II*

A 65% solution of hexamethylene diamine-adipic acid salt in water at 208° C. is pumped continuously into a reaction vessel in which the salt is concentrated until a temperature of 235° C. at 250 p.s.i. is reached over an average residence time of 3 hours. The pressure is then reduced to atmospheric and a considerable portion of the water permitted to vaporize. The resulting mixture of low molecular weight polymer in water having a relative viscosity of about 10 and a water content of about 14% is pumped continuously through a vented vessel where the water content is reduced to approximately 0.5% and relative viscosity raised to approximately 20. The resultant polymer is pumped continuously through an evacuated vessel where the water content is reduced to about 0.1%. The polymer is then pumped through a pipeline of 1 inch diameter and 90 foot length where the molecular weight increases to an equilibrium level. When samples of polymer are taken from the center and near the inner periphery of the pipeline, it is found that the polymer in the center has a viscosity at 285° C. of 1025 poises while that adjacent the periphery has a viscosity of 2100 poises. When nine flow inverters which remove 10% of the peripheral polymer and exchange it with an equal amount of polymer from the center of the line are placed in the line, at intervals of 10 feet, the viscosity of the polymer from the center of the line is increased to 1640 poises while that at the periphery remains at 2100 poises. In addition, the percentage of material having the equilibrium viscosity of 2100 poises is increased from 26 to 40% by the use of the flow inverters and the percentage of material that resides in the line long enough to gel is reduced by a factor of ten. Thus, the uniformity of the polymer is greatly increased by the introduction of flow inverters into the line.

The flow inverter of this invention is effective in decreasing inequalities in the residence time of viscous polymers in conduits and are thus extremely useful in many applications. The inverter is simple to construct, install and operate. Since it has no moving parts, there is virtually no maintenance involved. The inverter may be constructed from a variety of materials such as various metals, plastics, etc.

It is, of course, desirable to minimize the pressure drop across the inverted. To accomplish this, the inverter should be designed in such manner as to provide conduits of the maximum diameter, minimum length and optimum streamlining.

Flow inverters may also be used with a reverse orientation to that illustrated in the drawings and the foregoing examples to effect the removal of a small fraction of the liquid from the center of the stream and place it in a thin layer adjacent to the wall of the conduit. This is advantageous in the transfer of polymers where rapid polymerization is taking place since the low viscosity material transferred from the center to the outside acts as a lubricant thereby producing a close approach to plug flow.

While the amount of material transferred from the outer portion of the stream to the inside will vary depending on the application, the number of inverters required to give the closest approach to uniform residence time may be calculated from the formula, $$N = \frac{1}{F} - 1$$

where N is the number of inverters required and F is the fraction of the total stream which is diverted from the outside to the inside. Obviously, a smaller number than required by the above formula will yield some improvement but a larger number is not necessary. In the above equation it is assumed that the inverter or inverters are uniformly distributed throughout the length of the pipeline.

By using the flow inverters of this invention, any desired fraction of the polymer from the wall area or center portion of a conduit system can be interchanged with the polymer from the other area.

The process and apparatus of this invention may obviously be used in any application where the flow patterns of a viscous fluid produces undesirable differences in residence time of the fluid in the conduit.

A smooth interchange of the inner and outer fluids must be achieved in order to attain the desired equalization of residence time of the viscous liquid in the conduit. The slow moving peripheral liquid must be moved to the center where it can flow faster while the faster moving central fluid must be moved to the outside where it moves slowly in order to accomplish the desired effect. If the flow inverter produces turbulence and mixing, this obviously will not be accomplished. It is critical, therefore, that the inverter be streamlined to eliminate edges or obstructions which would cause turbulence and mixing of the inner and outer fluids.

This is a continuation of our copending application Serial No. 835,350, filed Agust 21, 1959, now abandoned.

In accordance with the patent laws, a preferred embodiment of this invention has been disclosed in detail. Numerous changes and modifications within the spirit of the invention will occur to those skilled in the art and all such are considered to fall within the scope of the following claims wherein:

We claim:

1. An improved fluid flow inverter device in combination with a closed cylindrical fluid conduit for handling a moving fluid stream having a relatively high viscosity, said device comprising an integral housing unit adapted to be fitted and positioned in a fluid-tight arrangement within such a closed conduit conforming to the inner surface thereof, said housing comprising a first fluid directing portion for separating an annular outer portion of fluid in the conduit from the fluid in the central portion of such a conduit and simultaneously smoothly deflecting the separated outer portion laterally angularly into a first channel means, said first channel means operatively joined with said first fluid directing portion to direct the separated deflected outer portion fluid into the central portion of the conduit downstream of the device, said housing further comprising a second channel means constructed and arranged to direct the incoming central portions of the fluid outwardly downstream of the device, said housing further comprising a second fluid directing portion for receiving outwardly directed fluid from the central portion of the incoming fluid and smoothly distributing it into the annular outer portion of the conduit downstream of said device, the construction and arrangement of all of said means such that undesirable turbulence and flow resistance in the conduit are minimized.

2. The device of claim 1 in which each of said first and second channel means is provided with a portion between its ends of restricted transverse cross section, the cross section of each said channel means increasing uniformly and smoothly to a maximum value at each end thereof.

3. An improved process for handling a moving fluid stream of relatively high viscosity material in a closed conduit to equalize the flow, provide uniform residence time and prevent the formation of stagnant areas of material in the conduit, said process comprising simultaneously, at a plurality of uniformly distributed longitudinally spaced positions along the conduit, smoothly separating annular outer portions of the fluid in the conduit from the fluid in the central portions of the conduit, smoothly deflecting the separated outer portions laterally angularly and then directing the outer portions into the central portions of the conduit downstream of each position while directing the incoming central portions of the fluid at each position outwardly downstream of each position, and smoothly distributing the outwardly directed fluid at each position into the annular outer portions of the conduit downstream of each device, the proportion of fluid separated in the annular outer portion and the number of positions selected so that for a given plurality of positions, substantially all of the fluid in the conduit has changed its position radially in the conduit.

4. The improved process of claim 3 in which the number of spaced positions is governed by the following expression $$N = \frac{1}{F} - 1$$

where N is the number of positions required and F is the fraction of total fluid stream diverted from the outer portion to the central portion.

References Cited in the file of this patent
UNITED STATES PATENTS

| | | |
|---|---|---|
| 2,600,733 | Clift | June 17, 1952 |
| 2,601,018 | Heyl et al. | June 17, 1952 |
| 2,871,000 | Dowling | Jan. 27, 1959 |